(12) United States Patent
Smith et al.

(10) Patent No.: US 7,429,950 B2
(45) Date of Patent: Sep. 30, 2008

(54) METHOD AND APPARATUS TO EXTEND ADS PERFORMANCE METRICS

(75) Inventors: Alexander E. Smith, McLean, VA (US); Eric Cassell, Burke, VA (US)

(73) Assignee: ERA Systems Corporation, Reston, VA (US)

( * ) Notice: Subject to any disclaimer, the term of this patent is extended or adjusted under 35 U.S.C. 154(b) by 8 days.

(21) Appl. No.: 11/492,711

(22) Filed: Jul. 25, 2006

(65) Prior Publication Data

US 2008/0191942 A1 Aug. 14, 2008

Related U.S. Application Data

(63) Continuation-in-part of application No. 11/343,079, filed on Jan. 30, 2006, and a continuation-in-part of application No. 11/342,289, filed on Jan. 28, 2006, and a continuation-in-part of application No. 11/203,823, filed on Aug. 15, 2005, and a continuation-in-part of application No. 11/145,170, filed on Jun. 6, 2005, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, application No. 10/743,042, which is a continuation-in-part of application No. 10/319,725, filed on Dec. 16, 2002, now Pat. No. 6,812,890.

(60) Provisional application No. 60/440,618, filed on Jan. 17, 2003, provisional application No. 60/123,170, filed on Mar. 5, 1999.

(51) Int. Cl.
*G01S 3/02* (2006.01)

(52) U.S. Cl. ............... 342/456; 342/32; 342/37; 342/174

(58) Field of Classification Search ............... 342/32, 342/37, 165, 174, 455–456; 701/117, 120
See application file for complete search history.

(56) References Cited

U.S. PATENT DOCUMENTS 1,738,571 A 12/1929 Gare .................. 404/18

FOREIGN PATENT DOCUMENTS

JP 9-288175 A 11/1994

OTHER PUBLICATIONS

Traffic Alert System Technical Design Summary, Final Report, Apr. 1994 (Baldwin et al.).

*Primary Examiner*—Dao L Phan
(74) *Attorney, Agent, or Firm*—Robert Platt Bell

(57) ABSTRACT

A method and system are provided for measuring and monitoring performance metrics of a non-ADS-B tracking system and generating performance metrics for the non-ADS-B tracking system in terms of ADS-B equivalent performance metrics. An aircraft transmits various transponder-based or other signals which are received at multiple ground stations, some of which may be ADS-B stations or both ADS-B and multilateration stations. ADS-B signals may contain performance metrics which are passed on from ADS-B station to an ADS-B processor, which outputs aircraft-derived metrics. ADS-B signals and all other transponder signals are also received at all ground stations, time-stamped, and sent to a multilateration processor, which generates multilateration metrics. Therefore two streams of information are passed onto ATC system processor containing the ADS-B aircraft-derived metrics and multilateration-derived metrics. The ATC system processor may then be configured to pass along both sets of messages to the ATC system, or to select a combination or fusion of the best metrics and tracking information for an aircraft.

20 Claims, 12 Drawing Sheets

U.S. PATENT DOCUMENTS

| | | | | |
|---|---|---|---|---|
| 3,668,403 A | 6/1972 | Meilander | | 701/121 |
| 3,705,404 A | 12/1972 | Chisholm | | 343/112 R |
| 3,792,472 A | 2/1974 | Payne et al. | | 342/32 |
| 4,079,414 A | 3/1978 | Sullivan | | 725/114 |
| 4,122,522 A | 10/1978 | Smith | | 701/15 |
| 4,167,006 A | 9/1979 | Funatsu et al. | | 343/6.5 LC |
| 4,196,474 A | 4/1980 | Buchanan et al. | | 364/461 |
| 4,224,669 A | 9/1980 | Brame | | 701/8 |
| 4,229,737 A | 10/1980 | Heldwein et al. | | 343/6 R |
| 4,293,857 A | 10/1981 | Baldwin | | 343/6.5 |
| 4,327,437 A | 4/1982 | Frosch et al. | | 714/3 |
| 4,359,733 A | 11/1982 | O'Neill | | 342/36 |
| 4,454,510 A | 6/1984 | Crow | | 343/5 |
| 4,524,931 A | 6/1985 | Nilsson | | 246/167 |
| 4,646,244 A | 2/1987 | Bateman et al. | | 701/301 |
| 4,688,046 A | 8/1987 | Schwab | | 342/456 |
| 4,782,450 A | 11/1988 | Flax | | 364/461 |
| 4,811,308 A | 3/1989 | Michel | | 367/136 |
| 4,899,296 A | 2/1990 | Khattak | | 702/40 |
| 4,914,733 A | 4/1990 | Gralnick | | 340/961 |
| 5,075,694 A | 12/1991 | Donnangelo et al. | | 342/455 |
| 5,144,315 A | 9/1992 | Schwab et al. | | 342/49 |
| 5,153,836 A | 10/1992 | Fraughton et al. | | 364/461 |
| 5,191,342 A | 3/1993 | Alsup et al. | | 342/465 |
| 5,260,702 A | 11/1993 | Thompson | | 340/970 |
| 5,262,784 A | 11/1993 | Drobnicki et al. | | 342/45 |
| 5,268,698 A | 12/1993 | Smith et al. | | 342/450 |
| 5,283,574 A | 2/1994 | Grove | | 340/970 |
| 5,317,316 A | 5/1994 | Sturm et al. | | 342/30 |
| 5,365,516 A | 11/1994 | Jandrell | | 370/18 |
| 5,374,932 A | 12/1994 | Wyschogrod et al. | | 342/36 |
| 5,381,140 A | 1/1995 | Kuroda et al. | | 340/961 |
| 5,402,116 A | 3/1995 | Ashley | | 340/870.1 |
| 5,454,720 A | 10/1995 | FitzGerald et al. | | 434/27 |
| 5,506,590 A | 4/1996 | Minter | | 342/462 |
| 5,528,244 A | 6/1996 | Schwab | | 342/37 |
| 5,570,095 A | 10/1996 | Drouilhet, Jr. et al. | | 342/357 |
| 5,596,326 A | 1/1997 | Fitts | | 342/30 |
| 5,596,332 A | 1/1997 | Coles et al. | | 342/455 |
| 5,627,546 A | 5/1997 | Crow | | 342/352 |
| 5,629,691 A | 5/1997 | Jain | | 340/961 |
| 5,666,110 A | 9/1997 | Paterson | | 340/970 |
| 5,680,140 A | 10/1997 | Loomis | | 342/357 |
| 5,714,948 A | 2/1998 | Farmakis et al. | | 340/961 |
| 5,752,216 A | 5/1998 | Carlson et al. | | 701/120 |
| 5,774,829 A | 6/1998 | Cisneros et al. | | 701/213 |
| 5,781,150 A | 7/1998 | Norris | | 342/357 |
| 5,798,712 A | 8/1998 | Coquin | | 340/970 |
| 5,839,080 A | 11/1998 | Muller | | 701/9 |
| 5,867,804 A | 2/1999 | Pilley et al. | | 701/120 |
| 5,884,222 A | 3/1999 | Denoize et al. | | 701/301 |
| 5,890,068 A | 3/1999 | Fattouce et al. | | 455/456.2 |
| 5,999,116 A | 12/1999 | Evers | | 342/36 |
| 6,049,304 A | 4/2000 | Rudel et al. | | 342/357.08 |
| 6,085,150 A | 7/2000 | Henry et al. | | 701/301 |
| 6,088,634 A | 7/2000 | Muller | | 701/9 |
| 6,092,009 A | 7/2000 | Glover | | 701/14 |
| 6,094,169 A | 7/2000 | Smith et al. | | 342/465 |
| 6,122,570 A | 9/2000 | Muller | | 701/9 |
| 6,127,944 A | 10/2000 | Daly | | 340/963 |
| 6,133,867 A | 10/2000 | Eberwine et al. | | 342/29 |
| 6,138,060 A | 10/2000 | Conner | | 701/9 |
| 6,201,499 B1 | 3/2001 | Hawkes et al. | | 342/387 |
| 6,208,284 B1 | 3/2001 | Woodell et al. | | 342/30 |
| 6,211,811 B1 | 4/2001 | Evers | | 342/36 |
| 6,219,592 B1 | 4/2001 | Muller et al. | | 701/9 |
| 6,292,721 B1 | 9/2001 | Conner et al. | | 701/9 |
| 6,311,127 B1 | 10/2001 | Stratton et al. | | 701/213 |
| 6,314,363 B1 | 11/2001 | Pilley et al. | | 701/120 |
| 6,347,263 B1 | 2/2002 | Johnson et al. | | 701/14 |
| 6,380,870 B1 | 4/2002 | Conner et al. | | 340/970 |
| 6,384,783 B1 | 5/2002 | Smith et al. | | 342/387 |
| 6,445,310 B1 | 9/2002 | Bateman et al. | | 340/970 |
| 6,448,929 B1 | 9/2002 | Smith et al. | | 342/456 |
| 6,463,383 B1 | 10/2002 | Baiada et al. | | 701/120 |
| 6,469,664 B1 | 10/2002 | Michaelson et al. | | 342/357.13 |
| 6,477,449 B1 | 11/2002 | Conner et al. | | 701/4 |
| 6,567,043 B2 | 5/2003 | Smith et al. | | 342/450 |
| 6,571,155 B2 | 5/2003 | Carriker et al. | | 701/3 |
| 6,584,414 B1 | 6/2003 | Green et al. | | 702/33 |
| 6,606,034 B1 | 8/2003 | Muller et al. | | 340/970 |
| 6,615,648 B1 | 9/2003 | Ferguson et al. | | 73/146 |
| 6,633,259 B1 | 10/2003 | Smith et al. | | 342/456 |
| 6,691,004 B2 | 2/2004 | Johnson | | 701/14 |
| 6,707,394 B2 | 3/2004 | Ishihara et al. | | 340/970 |
| 6,710,723 B2 | 3/2004 | Muller | | 340/970 |
| 6,750,815 B2 | 6/2004 | Michaelson et al. | | 342/357.13 |
| 6,789,011 B2 | 9/2004 | Baiada et al. | | 701/120 |
| 6,812,890 B2 | 11/2004 | Smith et al. | | 342/454 |
| 6,873,903 B2 | 3/2005 | Baiada et al. | | 701/120 |
| 6,885,340 B2 | 4/2005 | Smith et al. | | 342/465 |
| 6,927,701 B2 | 8/2005 | Schmidt et al. | | 340/959 |
| 6,930,638 B2 | 8/2005 | Lloyd et al. | | 342/453 |
| 6,992,626 B2 | 1/2006 | Smith | | 342/454 |
| 7,123,169 B2 | 10/2006 | Farmer et al. | | 340/945 |
| 7,123,192 B2 | 10/2006 | Smith et al. | | 342/455 |
| 7,126,534 B2 | 10/2006 | Smith et al. | | 342/456 |
| 7,142,154 B2 | 11/2006 | Quilter et al. | | 342/357.06 |
| 2001/0026240 A1 | 10/2001 | Neher | | 342/357.07 |
| 2002/0021247 A1 | 2/2002 | Smith et al. | | 342/450 |
| 2002/0089433 A1 | 7/2002 | Bateman et al. | | 340/970 |
| 2003/0009267 A1 | 1/2003 | Dunsky et al. | | 701/4 |
| 2004/0004554 A1 | 1/2004 | Srinivasan et al. | | 340/870.01 |
| 2004/0044463 A1* | 3/2004 | Shen-Feng et al. | | 701/120 |
| 2004/0225432 A1 | 11/2004 | Pilley et al. | | 701/117 |
| 2005/0021283 A1 | 1/2005 | Brinton et al. | | 702/150 |
| 2005/0046569 A1 | 3/2005 | Spriggs et al. | | 340/551 |
| 2006/0191326 A1* | 8/2006 | Smith et al. | | 73/73 |
| 2006/0276201 A1 | 12/2006 | Dupray | | 455/456.1 |
| 2007/0159378 A1* | 7/2007 | Powers et al. | | 342/29 |

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |
| WO | WO 94/14251 | 6/1994 |
| WO | WO 99/50985 | 10/1999 |

OTHER PUBLICATIONS

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Customers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquistion of Airport Noise and Operations Monitoring System (NOMS), Indianapolis Airport Authority, Oct. 21, 2003.

Technical Specifications, for a Aircraft Flight Track and Noise Management System for the Regional Airport Authority of Louisville and Jefferson County Prepared by: Harris Miller Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131-04 Version 1.1", NLR-CR-2004-472, Roke Manor Research, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary survelliance radar range differences,☐ IEE Proceedings-F, Radar, Sonar, Navigation, vol. 141, No. 2, pp. 139-148, 1994.

GPS Risk Assessment Study, Final Report, T.M. Corrigan et al., Johns Hopkins university, Applied Physics Laboratory, Jan. 1999.

Aircraft Noise Report, vol. 17, No. 1, Jan. 31, 2005.

ASA MASPS—Change Issue, James Maynard, Oct. 21, 2002.

ADS-B, Automatic Dependent Surveillance—Broadcast Will ADS-B Increase Safety and Security for Aviation?, First written Mar. 1999 revised Jul. 2000, by Darryl H. Phillips AirSport Corporation—1100 West Cherokee—Sallisaw OK 74955 voice: 918-755-4010—fax: 918-775-4000.

ASA MASPS—Change Issue, Greg Stayton, Aug. 1, 2002.

ASA MASPS—Change Issue, Michael Petri, Oct. 23, 2002.

ASA MASPS—Change Issue, J. Stuart Searight, Nov. 18, 2002.

ASA MASPS—Change Issue, Michael Petri, Dec. 16, 2002.

ASA MASPS—Change Issue, J. Stuart Searight, Jan. 23, 2003.

ASA MASPS—Change Issue, Tony Warren, Feb. 3, 2003.

ASA MASPS—Change Issue, Steve George, Apr. 23, 2003.

ASA MASPS—Change Issue, James Maynard, Apr. 23, 2003.

ASA MASPS—Change Issue, T.E. Foster, Jun. 11, 2003.

ASA MASPS—Change Issue, Jonathan Hammer et al., Jan. 13, 2004.

ASA MASPS—Change Issue, Tom Mosher, Jan. 13, 2004.

ASA MASPS—Change Issue, Mike Castle, Feb. 13, 2004.

ASA MASPS—Change Issue, Tony Warren, Sep. 10, 2004.

ASA MASPS—Change Issue, Mike Castle, Sep. 10, 2004.

ASA MASPS—Change Issue, Bob Smith, Sep. 1, 2004.

ASA MASPS—Change Issue, Heleberg and Kaliardos, Oct. 15, 2004.

ASA MASPS—Change Issue, Taji Shafaat, Sep. 19, 2004.

ASA MASPS—Change Issue, Stuart Searight, Nov. 3, 2004.

A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

Draft Proposal for the Amendment of the Sub-Cap on Off-Peak Takeoff and Landing Charges at Dublin Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management , Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches A Unique Solution for ADS-B,. Jan. 19, 2005, Raytheon Corp. http://www.raytheon.co.uk/highlights/ATMS.html.

Raytheon Systems Liminted's ADS-B Solution Prised by International Sir Tzraffic Authorities, Feb. 2, 2005, http://www.raytheon.co.uk/news_room/news/press_02022005.pdf.

Boeing Subsidary and Megadata Announce Joint Marketing Agreement, Press Release, Aug. 7, 2003.

Federal Airways & Airspace, Inc. Because Accuracy Matters, Feb. 2003, Jan. 2002.

VDL4 TM Alignment with DO-242A (RTCA ADS-B MASPS) WG51/SG2, NASA, Sep. 2003.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, ©1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SCI186-033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

Raytheon Systems Limited Launches A Unique Solution for ADS-B,. Jan. 19, 2005, Raytheon Corp. http://www.raytheon.co.uk/highlights/ATMS.html.

Raytheon Systems Limited's ADS-B Solution Prized by International Air Traffic Authorities, Feb. 2, 2005, http://www.raytheon.co.uk/news_room/news/press_02022005.pdf.

Method to Provide System-Wide ADS-B Back-Up, Validation, and Security, A. Smith et al. 25th AIAA/IEEE Digital Avionics Systems Conference, Oct. 15, 2006.

*Positive Identification of Aircraft on Surface Movement Area—Results of FAA Trails*, 10th Annual International AeroSense Symposium, Orlando, Flordia, Apr. 1996.

*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17th Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp71107948 2021710.pdf Nov. 2004.

*Cel-Loc How We Do it, Technology Overview*, http://www.cell-loc.com/how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.

Damarel Systems International, LTD, Travel Automation Specialists, © 2004, www.dameral.com.

Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.

*The Twilight Zone, Can Wide-Area Multilateration Systems Become A Nightmare for MSSR Producers?* Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, SIEMENS, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Published in Professional Pilot Magazine, Jun. 1999.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportation Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

* cited by examiner

| NIC (Notes 1, 2) | Horizontal and Vertical Containment Bounds | Comment | Notes |
|---|---|---|---|
| 0 | $R_C \geq 37.04$ km (20 NM) | Unknown Integrity | |
| 1 | $R_C < 37.04$ km (20 NM) | RNP-10 containment radius | 6 |
| 2 | $R_C < 14.816$ km (8 NM) | RNP-4 containment radius | 3, 6 |
| 3 | $R_C < 7.408$ km (4 NM) | RNP-2 containment radius | 6 |
| 4 | $R_C < 3.704$ km (2 NM) | RNP-1 containment radius | 6 |
| 5 | $R_C < 1852$ m (1 NM) | RNP-0.5 containment radius | 6 |
| 6 | $R_C < 1111.2$ m (0.6 NM) | RNP-0.3 containment radius | 6 |
| 7 | $R_C < 370.4$ m (0.2 NM) | RNP-0.1 containment radius | 6 |
| 8 | $R_C < 185.2$ m (0.1 NM) | RNP-0.05 containment radius | 6 |
| 9 | $R_C < 75$ m and VPL < 112 m | e.g., WAAS HPL, VPL | 4, 5 |
| 10 | $R_C < 25$ m and VPL < 37.5 m | e.g., WAAS HPL, VPL | 4, 5 |
| 11 | $R_C < 7.5$ m and VPL < 11 m | e.g., LAAS HPL, VPL | 4, 5 |

Table 1 (Prior Art)

| $NAC_P$ | 95% Horizontal and Vertical Accuracy Bounds (EPU and VEPU) | Comment | Notes |
|---|---|---|---|
| 0 | EPU $\geq$ 18.52 km (10 NM) | Unknown accuracy | |
| 1 | EPU < 18.52 km (10 NM) | RNP-10 accuracy | 1 |
| 2 | EPU < 7.408 km (4 NM) | RNP-4 accuracy | 1 |
| 3 | EPU < 3.704 km (2 NM) | RNP-2 accuracy | 1 |
| 4 | EPU < 1852 m (1NM) | RNP-1 accuracy | 1 |
| 5 | EPU < 926 m (0.5 NM) | RNP-0.5 accuracy | 1 |
| 6 | EPU < 555.6 m (0.3 NM) | RNP-0.3 accuracy | 1 |
| 7 | EPU < 185.2 m (0.1 NM) | RNP-0.1 accuracy | 1 |
| 8 | EPU < 92.6 m (0.05 NM) | e.g., GPS (with SA) | 1 |
| 9 | EPU < 30 m and VEPU < 45 m | e.g., GPS (SA off) | 2 |
| 10 | EPU < 10 m and VEPU < 15 m | e.g., WAAS | 2 |
| 11 | EPU < 3 m and VEPU < 4 m | e.g., LAAS | 2 |

Table 2 (Prior Art)

| $NAC_V$ | Horizontal Velocity Error (95%) | Vertical Geometric Velocity Error (95%) |
|---|---|---|
| 0 | Unknown or ≥ 10 m/s | Unknown or ≥ 50 feet (15.24 m) per second |
| 1 | < 10 m/s | < 50 feet (15.24 m) per second |
| 2 | < 3 m/s | < 15 feet (4.57 m) per second |
| 3 | < 1 m/s | < 5 feet (1.52 m) per second |
| 4 | < 0.3 m/s | < 1.5 feet (0.46 m) per second |

Table 3 (Prior Art)

| SIL | Probability of Exceeding the $R_C$ Integrity Containment Radius Without Detection | Comment |
|---|---|---|
| 0 | Unknown | "No Hazard Level" Navigation Source |
| 1 | $1 \times 10^{-3}$ per flight hour or per operation | "Minor Hazard Level" Navigation Source |
| 2 | $1 \times 10^{-5}$ per flight hour or per operation | "Major Hazard Level" Navigation Source |
| 3 | $1 \times 10^{-7}$ per flight hour or per operation | "Severe Major Hazard Level" Navigation Source |

Table 4 (Prior Art)

| BAQ | Meaning |
|---|---|
| 0 | Barometric altitude not certified for IFR use |
| 1 | Barometric altitude with 100 feet resolution |
| 2 | Barometric altitude with 25 feet resolution |
| 3 | Barometric altitude meets RVSM requirements |

Table 5 (Prior Art)

| SSR Error Model | Operational Margin (NM) | NACp for ADS-B to ADS-B | NACp for ADS-B to SSR | NIC for ADS-B to ADS-B | NIC for ADS-B to SSR | SIL |
|---|---|---|---|---|---|---|
| Gaussian | 1.4 | 7 (σ = 76 m) | 7 (σ = 76 m) | 5 (Rc = 1 NM) | 6 (Rc = 0.6 NM) | 2 ($10^{-5}$/hr) |
| Wide angle | 0.6 | 6 (σ = 228 m) | 7 (σ = 76 m) | 5 (Rc = 1 NM) | 6 (Rc = 0.6 NM) | 2 ($10^{-5}$/hr) |

Table 6 (Prior Art)

| SSR Error Model | Operational Margin (NM) | NACp for ADS-B to ADS-B | NIC for ADS-B to ADS-B | SIL |
|---|---|---|---|---|
| Gaussian | 2.1 | 6 (σ = 228 m) | 4 (Rc = 2 NM) | 2 ($10^{-5}$/hr) |
| Wide angle | 0.8 | 5 (σ = 380 m) | 4 (Rc = 2 NM) | 2 ($10^{-5}$/hr) |

Table 7 (Prior Art)

| Performance Metric | Aircraft-Based, e.g., ADS-B | Non Aircraft-Based, e.g., Multilateration or SSR |
|---|---|---|
| Horizontal & Vertical Containment Bounds | Navigation Integrity Category (NIC) | Surveillance Integrity Category (SIC) |
| 95% Horizontal & Vertical Accuracy Bounds | Navigation Accuracy Category for Position (NACp) | Surveillance Accuracy Category for Position (SACp) |
| 95% Horizontal & Vertical Velocity Error | Navigation Accuracy Category for Velocity (NACv) | Surveillance Accuracy Category for Velocity (SACv) |
| Probability Exceedence Integrity Containment Radius | Surveillance Integrity Level (SIL) | Surveillance Integrity Level (SIL) |
| Future Encoding Baro Quality | Baro Altitude Quality (BAQ) | Baro Altitude Quality (BAQ) |

Table 8

| | Accuracy (RMS) | |
|---|---|---|
| Distance (NM) | Feet | Meters |
| 60 | ±1050 | ±320.1 |
| 250 | ±4374 | ±1333.7 |

Table 9 (Prior Art)

| Coverage Region | Requirement | WAMLAT Performance |
|---|---|---|
| Terminal | 0.98 per 4.8 sec | 0.9999999 per 5 sec |
| En route | 0.98 per 12 sec | 0.999999 per 5 sec |

Table 10

| Coverage Region | Requirement | WAMLAT Performance |
|---|---|---|
| Terminal | 0.99995 | 0.99999 |
| En route | 0.9997 | 0.99995 |

Table 11

METHOD AND APPARATUS TO EXTEND ADS PERFORMANCE METRICS

CROSS-REFERENCE TO RELATED APPLICATIONS

This application is a Continuation-In-Part of U.S. patent application Ser. No. 11/343,079, Filed Jan. 30, 2006 and incorporated herein by reference; This application is also a Continuation-In-Part of U.S. patent application Ser. No. 11/342,289 filed Jan. 28, 2006 and incorporated herein by reference; This application is a Continuation-In-Part of U.S. patent application Ser. No. 11/203,823 filed Aug. 15, 2005 and incorporated herein by reference; This application is a Continuation-In-Part of U.S. patent application Ser. No. 11/145,170 filed on Jun. 6, 2005 and incorporated herein by reference; This application is a Continuation-In-Part of U.S. patent application Ser. No. 10/743,042 filed Dec. 23, 2003 now U.S. Pat. No. 7,132,982 and incorporated herein by reference; application Ser. No. 10/743,042 is a Continuation-In-Part of U.S. patent application Ser. No. 10/638,524 filed Aug. 12, 2003 now U.S. Pat. No. 6,806,829 and incorporated herein by reference; application Ser. No. 10/638,524 is a Continuation of U.S. patent application Ser. No. 09/516,215 filed Feb. 29, 2000 now U.S. Pat. No. 6,633,259 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 now U.S. Pat. No. 6,812,890 and incorporated herein by reference. Application Ser. No. 10/743,042 is a Non Prov. of Provisional U.S. Patent Application Ser. No. 60/440,618 filed Jan. 17, 2003 and incorporated herein by reference.

FIELD OF THE INVENTION

The invention relates to the field of aircraft and ground vehicle tracking and surveillance. In particular, the present invention is related to techniques for quantifying the accuracy and backing up Automatic Dependent Surveillance (ADS) using multilateration techniques.

BACKGROUND OF THE INVENTION

Global implementation of Automatic Dependent Surveillance (ADS) is underway and promises to replace conventional radar surveillance (e.g., Secondary Surveillance Radar, or SSR) within the next 10 to 20 years. Switching to ADS from radar techniques represents a fundamental shift in the techniques and philosophy of aircraft tracking.

In support of this transition, many aviation organizations are developing standards to ensure a proper and well-engineered transition from present radar-based systems to an ADS environment. An important part of this is the use of "Figures of Merit" or quality indicators associated with ADS solutions. ADS cannot supplant conventional radar techniques unless it can be demonstrated to be at least as accurate as prior art radar surveillance techniques. Techniques for quantifying the accuracy of ADS are thus important to the implementation of ADS to supplant radar. Techniques for measuring the accuracy of prior art radar tracking systems might not lend themselves to quantifying the accuracy of ADS.

Working groups within RTCA (Radio Technical Commission for Aeronautics, RTCA, Inc., 1828 L Street, NW, Suite 805, Washington, D.C. 20036), EUROCAE (The European Organisation for Civil Aviation Equipment, EUROCAE, 17, rue Hamelin, 75116 Paris, FRANCE), and ICAO (International Civil Aviation Organization, ICAO, 999 University Street, Montreal, Quebec H3C 5H7, Canada) have developed performance metrics for ADS, and some standards and guidelines already exist. These developed and existing standards and guidelines include: *Minimum Aviation System Performance Standards for Automatic Dependent Surveillance*, RTCA 242A, dated Jun. 25, 2002, *Minimum Operational Performance Standards for 1090 MHz Extended Squitter Automatic Dependent Surveillance Broadcast (ADS-B) and Traffic Information Services Broadcast (TIS-B)*, RTCA 260A, 2003, which supersedes the earlier RTCA DO 260, and *Safety, Performance, and Interoperability Requirements Document for ADS-B-NRA Application*, ED-126 V1.0, December 2005, The European Organization for Civil Aviation Equipment, all of which are expressly incorporated herein by reference in their entirety.

RTCA standards define the "Figures of Merit" or quality indicators for the system. Positional data delivered by ADS-B typically depends on Global Navigation Satellite System (GNSS) receiver data. The RTCA DO260 standards require the generation and transmission of a value called "Navigational uncertainty Category" (NUC) to all ADS-B receivers, so that receivers can determine if the data is "good enough" to use.

GNSS uses satellite-positioning techniques to provide users with accurate and timely navigation information. A Global Positioning System (GPS) is a subset of a global navigation satellite system because a GPS system needs only to provide the ability to determine position information. GNSS also provides real time navigation information. In order to use GNSS for navigation, it must be possible to generate real-time navigation information fast enough for safe navigation.

When DO 260 was revised as 260A, NUC was specified in terms of NIC, NAC and SIL, defined as follows. Navigation Accuracy Category (NAC) is reported so that the surveillance application may determine whether the reported position has an acceptable level of accuracy for the intended application. Navigation Integrity Category (NIC) is reported so that the surveillance application may determine whether the reported position has an acceptable level of integrity for the intended application. Surveillance Integrity Level (SIL) is the probability that the integrity containment radius used in the NIC parameter will be exceeded.

Each of the parameters can be further subdivided for position and velocity (e.g., NUCp and NUCv). For a complete definition of each of these parameters please refer to RTCA DO 240A, incorporated herein by reference. From DO 240A, NIC, NAC, and SIL values are as presented in Tables 1-5 below.

Table 1 lists NIC values from 0 to 11 for a broad range of applications, ranging from lowest integrity (0) to highest integrity (11). Table 2 lists NAC values from lowest accuracy applications to highest application applications (i.e., LAAS or precision landing). Table 2 and Table 3 list separately the requirements for accuracy in position or velocity. Accuracy requirements are specified as 2 sigma, or 95%, meaning that 95% of the time the accuracy shall be better than that specified for each NAC value in the tables. Table 4 contains the integrity requirement, which is the probability that the target will exceed a predetermined containment radius. Table 5 contains a quality indicator that relates to aircraft barometric altimetry system performance.

A good discussion and definition of Required Navigation Performance (RNP) procedures may be found in the following documents, all of which are incorporated herein by reference http://www.aviationmanuals.com/articles/article3.html
www.boeing.com/commercial/caft/reference/documents/RNP082400S.pdf
www.icao.int/anb/panels/acp/WG/M/M8wp/WP/WP806-ATT4.doc
http://adsb.tc.faa.gov/RFG/ADS-B-NRA%20SPR-INTEROP%20_ED-126_%20v1.0.pdf ED-126 contains an assessment of ADS-B to Secondary Surveillance Radar (SSR) target separation requirements, and results of risk evaluations are shown in Table 6 and Table 7 from the EUROCAE document. As in the case of long range SSR to SSR separation, the relatively wide cross-range radar error distribution limits ADS-B effectiveness in supporting the above minimum required separation values of 2.9 NM or 4.2 NM.

Assurance that ADS-B based surveillance risk is at least as good as that of radar when separating ADS-B targets from radar targets requires defining ADS-B requirements so they are at least the Close Approach Probability (CAP) level obtained for radar to radar 5 NM separation. Using conservative values of NACp=6 and NIC=4 for ADS-B performance, and defining the radar cross-range error distribution, we get the results (Ccax where "x" is "s" or "w" depending on the Gaussian or wide angle error model) plotted in FIG. 1 in comparison to the reference values (Pcax) for SSR to SSR separation. Although ADS-B provides improved capability over the SSR baseline for the Gaussian SSR case, the SSR wide-angle errors at long ranges for the alternate assumption limit the incremental effectiveness of ADS-B in this case.

As defined by ED 126, the Close Approach Probability (CAP) is the probability that, when the surveillance positions of two aircraft appear to be separated by a distance S, their true separation is actually within a distance A (the size of an aircraft and typically 200 ft is used). The CAP is calculated from the assumed surveillance error distribution function (i.e. from the probability density function of the errors). In the case of radar, the position error distribution is taken for azimuth errors (cross-range errors) projected at the limit of the range of applicability of the separation minima (S). Ideally, the error distribution is determined from the analysis of real radar measurements. Note that this error distribution is for the normal operation of the radar in its particular environment with no radar equipment fault conditions (but including the tail errors caused by environmental effects). It is assumed that all the radar errors in the distribution are undetected by the radar.

If the position error distribution of a new surveillance system is known (from measurements and/or analytical predictions) then the surveillance risk can be calculated and compared to the reference radar system. Also, the surveillance risk between an aircraft position measured by existing radar and another measured by the new source of surveillance can be calculated.

In the case of (Automatic Dependent Surveillance, Broadcast) ADS-B, a quality indicator will qualify the expected accuracy of the ADS-B reported position and some integrity checking of the position is expected in conjunction. However, there may be some probability of not detecting position errors outside certain bounds and these errors will contribute to the overall undetected ADS-B position error distribution.

The above analyses show differences in SSR and ADS-B performance and essentially compare the performance metrics from both systems, which have quite different error mechanisms. The same type of analysis could be applied to multilateration and scenarios could be presented for comparing multilateration to SSR and ADS-B, as well as other technologies.

If ADS-B is to supplant SSR as a primary source of aircraft surveillance, some sort of a back-up and/or validation may be required. Many air traffic authorities recognize the need for a back-up to ADS-B and it is becoming a more common theme in aviation conferences worldwide, for example at ATCA conferences (www.ATCA.org), Maastricht ATC conferences (www.atcmaastricht.com), and Helios conferences and seminars (www.helios-is.com), all of which are incorporated herein by reference.

Surveillance alternatives generally considered for application as a back-up to ADS-B include:

Multilateration
Primary radar
Secondary Surveillance Radar (SSR)
Passive SSR
Passive Primary Radar
Other techniques including ADS-B angle of arrival from phase measurements (e.g., multi-sector antennas).

While aviation authorities worldwide discuss the idea of a back-up as redundant forms of surveillance, or as interoperable forms of surveillance, there is no existing methodology to combine the different sources of surveillance into an overall surveillance service with a common set of performance metrics. For example, in the United States, the Federal Aviation Administration (FAA) has revealed ambitious plans to commence with a national ADS-B program (www.faa.gov). The FAA is interested in back-up surveillance, and will currently consider performance-based approaches, which are not technology specific. However, in the Prior Art, there exists no methodology to combine data from different surveillance sources, based on the categorized quality of data SSR and ADS-B have different methodologies for tracking aircraft. However, as noted above, performance metrics for ADS-B have been established such that the accuracy and integrity of an ADS-B system can be readily determined. Back-up methodologies may require similar accuracy and integrity standards. However, again, since the methodologies differ in their underlying technology, creating equivalent metrics for monitoring such back-up systems may be difficult. Thus, it remains a requirement in the art to provide a system and method for monitoring and measuring metrics of a back-up methodology such as multilateration and presenting such metrics in the same or similar terms as ADS-B metrics.

SUMMARY OF THE INVENTION

In the present invention, ADS-B is used as the preferred primary means of surveillance with multilateration as the secondary, or a back-up means of surveillance. An aircraft transmits various transponder-based or other signals, including ADS-B signals, which may be 1090 MHz or other frequencies. These signals are received at multiple ground stations, some of which may be ADS-B stations or both ADS-B and multilateration stations.

ADS-B signals may contain all of the performance metrics, Navigation Accuracy Category (NAC), Navigation Integrity Category (NIC), Surveillance Integrity Level (SIL) and Barometric Altitude Quality (BAQ), which are passed on from ADS-B station to an ADS-B processor. The ADS-B processor then outputs aircraft-derived metrics NIC, NAC, SIL, BAQ. ADS-B signals and all other transponder signals are also received at all ground stations, time-stamped, and sent to a multilateration processor. The multilateration processor may then generate Surveillance Integrity Category (SIC), Surveillance Integrity Level (SIL) and pass on Barometric Altitude Quality (BAQ) information.

Therefore two streams of information are passed onto ATC system processor containing the ADS-B aircraft-derived metrics NIC, NAC, SIL, BAQ and the multilateration-derived metrics SIC, SAC, SIL, and BAQ. The ATC system processor may then be configured to pass along both sets of messages to the ATC system, or to select a combination or fusion of the best metrics and tracking information for an aircraft.

The performance of ADS-B as discussed above is determined by the performance of the navigation system (e.g., GNSS, GPS) and other on board aircraft sensors, whereas the performance of the surveillance system is dependent upon the ground-based infrastructure, such as SSR, Radar or multilateration. Thus, performance of the surveillance system is not dependent upon aircraft mounted hardware, which is not within the control of the airport operator or other user. As the two systems rely upon different hardware, one makes a good back-up for the other. However, since the technologies used are different in nature, comparing the metrics (performance parameters, accuracy, and the like) can be difficult. The present invention solves this problem by providing comparable metrics for both systems. Thus, an ATC system can evaluate the metrics of both systems and determine which is the more accurate of the two, or detect errors in a particular system.

BRIEF DESCRIPTION OF THE DRAWINGS AND TABLES

Table 1 lists NIC values from 0 to 1 for a broad range of applications, ranging from lowest integrity (0) to highest integrity (1).

Table 2 lists NAC values from lowest accuracy applications to highest application applications (i.e., LAAS or precision landing).

Table 3 lists the NAC values in velocity.

Table 4 defines the integrity levels, which are the probability that the target will exceed a predetermined containment radius.

Table 5 contains a quality indicator that relates to the aircraft's barometric altimetry system performance.

Table 6 tabulates the results of risk evaluations from an assessment of ADS-B to Secondary Surveillance Radar (SSR) target separation requirements.

Table 7 tabulates the results of risk evaluations from an assessment of ADS-B to Secondary Surveillance Radar (SSR) target separation requirements.

Table 8 illustrates ADS-B supplemented with Multilateration.

Table 9 summarizes the requirements along with the linear values based on distance for Radar Performance accuracy specified for the FAA's newest Radar system the Air Traffic Control Beacon Interrogator model six (ATCBI-6).

Table 10 summarizes results of a performance assessment was made of the Ohio Valley multilateration configuration.

Table 11 summarizes the results for both terminal and en route applications, comparing the requirements for each application to actual MANLAT performance.

Figure 3:
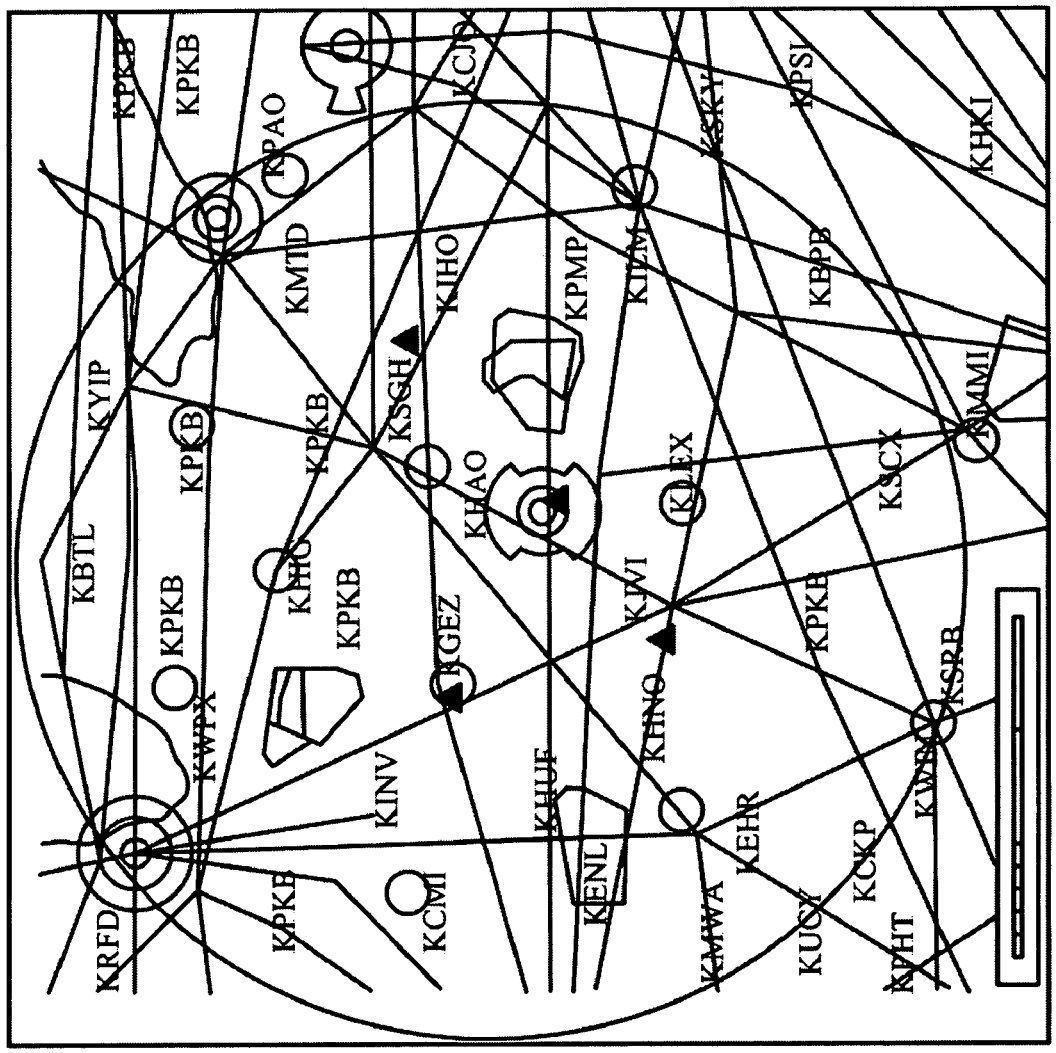

FIG. 3 indicates jet routes above 18,000 feet in the example area in the Ohio Valley where the en route coverage area is approximately 125,000 square miles.

Figure 4:
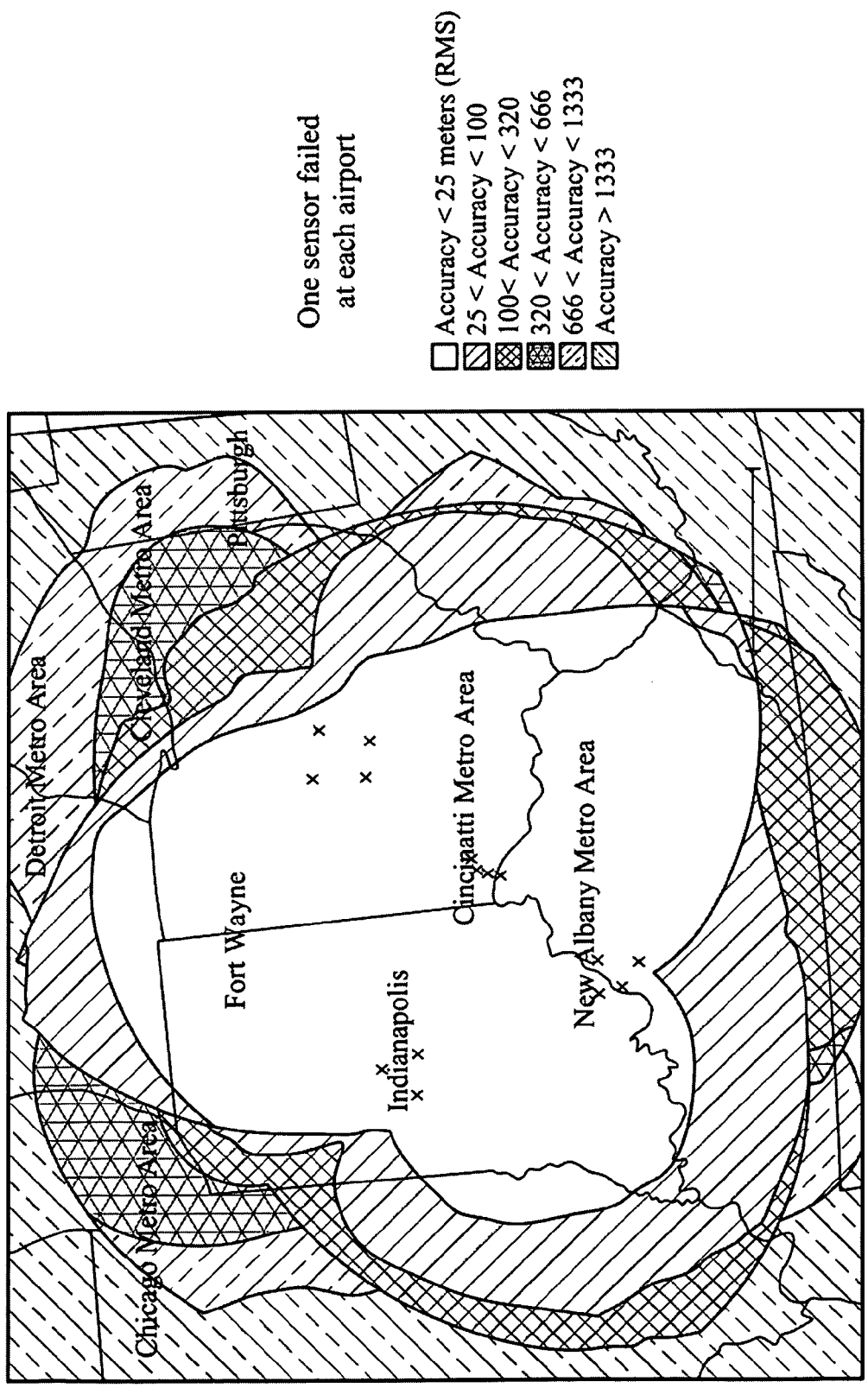

FIG. 4 is a diagram illustrating predicted accuracy at 18,000 feet with the geometry from the existing sensor layout, with one sensor failed in each airport system, or a total of 4 failed sensors.

Figure 5:
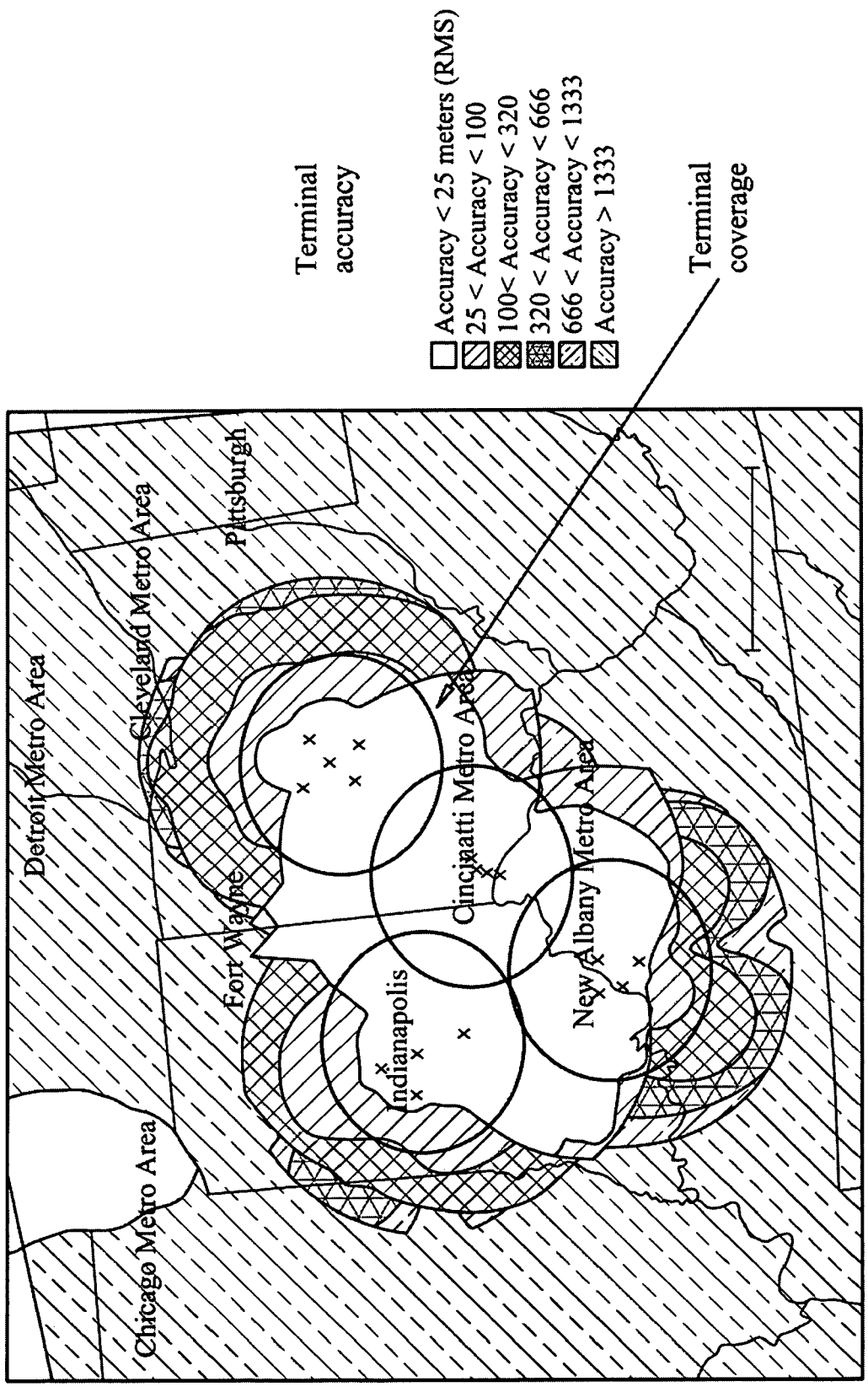

FIG. 5 is a diagram illustrating predicted accuracy at a 4,000 ft altitude for terminal operations, showing 60 mile radius required coverage in each of the four airport terminal areas.

Figure 6:

FIG. 6 illustrates the calculated DOP calculations for the geometry of the solution at 20,000 feet showing the accuracy of the surveillance solution.

Figure 7:

FIG. 7 illustrates the calculated DOP calculations for the geometry of the solution at 10,000 feet showing the accuracy of the surveillance solution.

DETAILED DESCRIPTION OF THE INVENTION

In the Prior Art, ADS-B metrics are based on aircraft reporting of quality due in large part to the aircraft-determined quality of the navigation sources, hence the use of "N" for navigation integrity and accuracy metrics. The surveillance-based approach of the present invention does not rely upon on-board aircraft navigation information (e.g., GPS, inertial navigation, or the like), and would therefore be separate and independent from that data. To distinguish the different sources it may be useful to consider different nomenclature, such as "S" for surveillance-derived metrics, as indicated in Table 8, which illustrates ADS-B supplemented with Multilateration.

Figure 1:
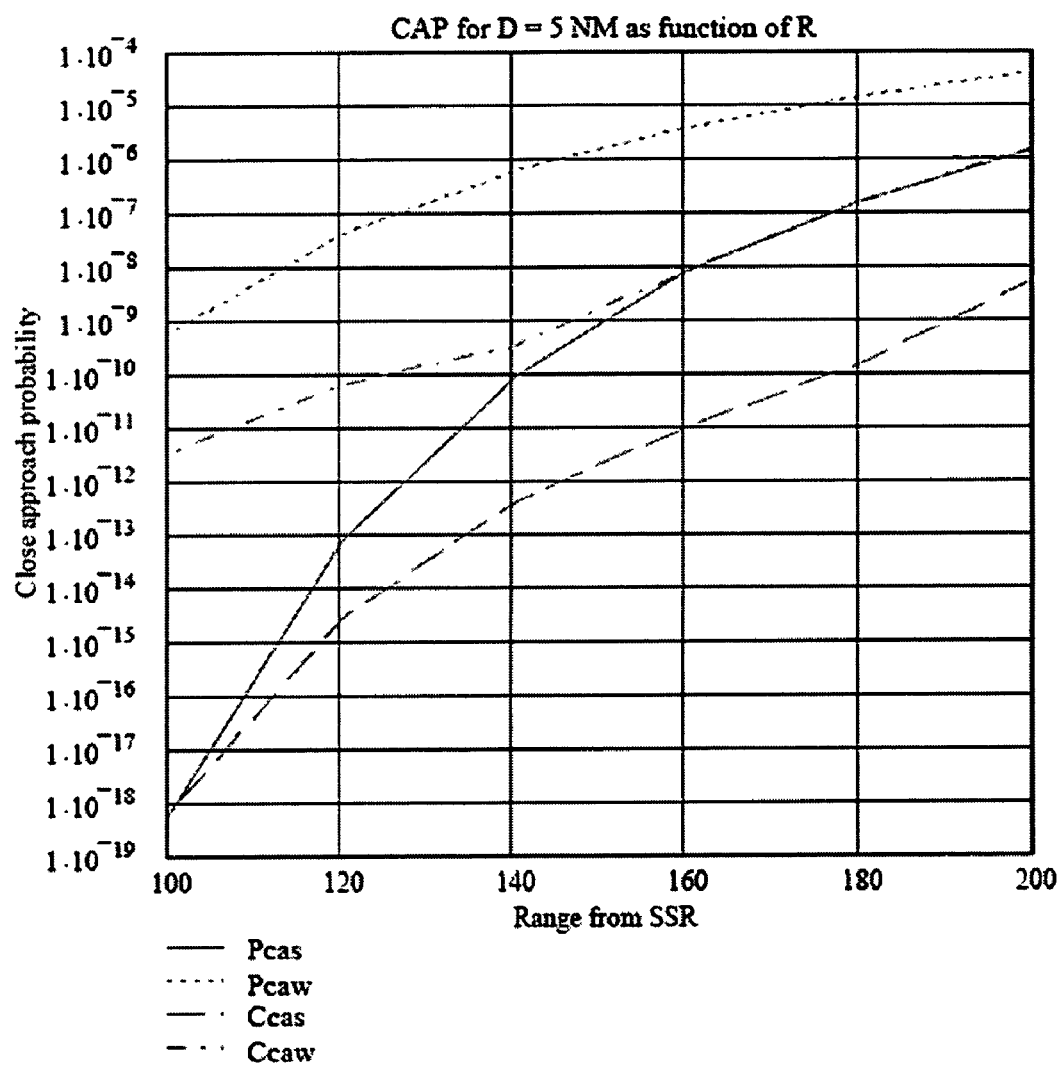
FIG. 1 is a plot, using conservative values of NACp=6 and NIC=4 for ADS-B performance, and defining the radar cross-range error distribution, of Close Approach Probability (Ccax where "x" is "s" or "w" depending on the Gaussian or wide angle error model) plotted in in comparison to the reference values (Pcax) for SSR to SSR separation.
Figure 2:
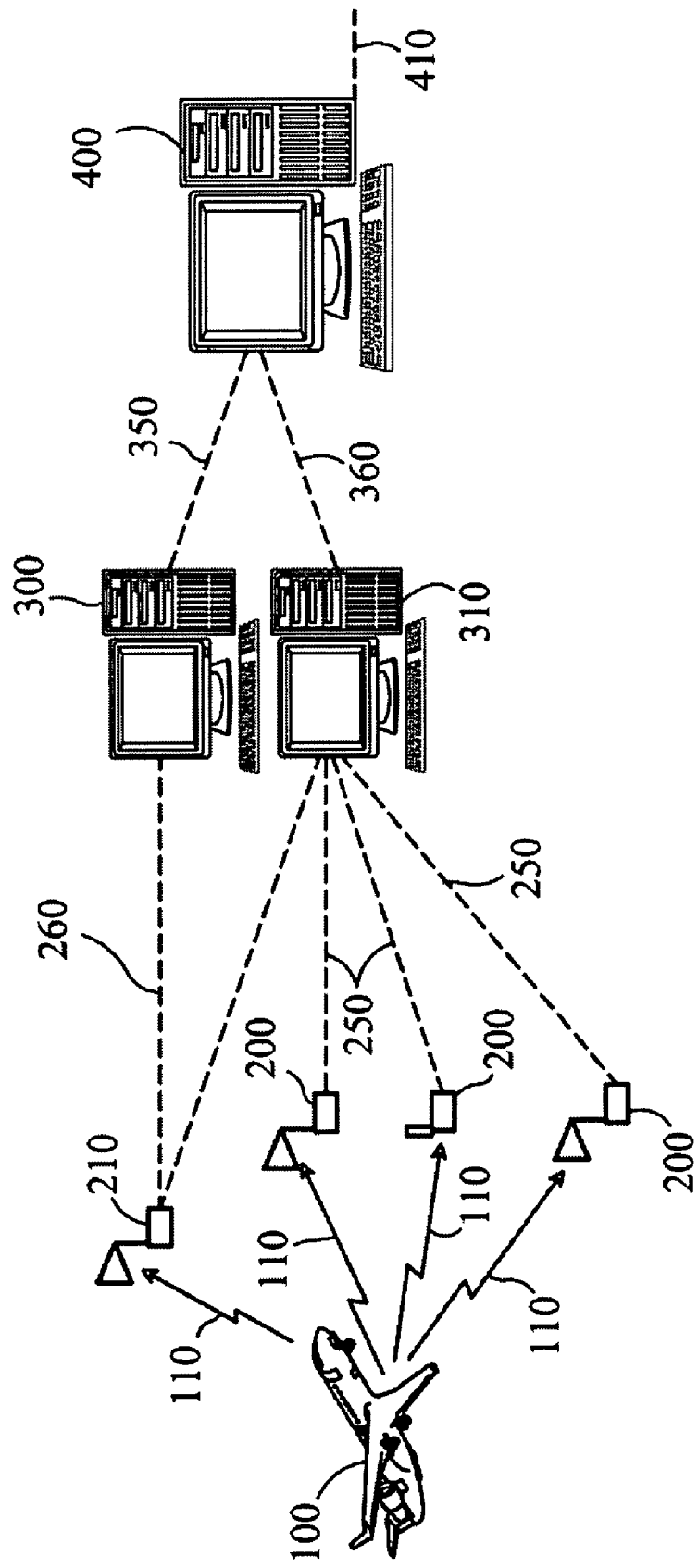
FIG. 2 is a block diagram illustrating the methodology of the present invention using ADS-B as the preferred primary means of surveillance with multilateration as the secondary, or as a back-up means of surveillance.

FIG. 2 is a block diagram illustrating the methodology of the present invention using ADS-B as the preferred primary means of surveillance with multilateration as the secondary, or a back-up means of surveillance. Aircraft 100 transmits various transponder-based or other signals 110, including ADS-B signals, which may be 1090 MHz or other frequencies. Signals 110 are received at multiple ground stations, some of which may be ADS-B stations 210 or both ADS-B and multilateration stations 200.

ADS-B signals 110 may contain all of the performance metrics, Navigation Accuracy Category (NAC), Navigation Integrity Category (NIC), Surveillance Integrity Level (SIL) and Barometric Altitude Quality (BAQ), which are passed on 260 from ADS-B station 210 to ADS-B processor 300. ADS-B processor then outputs aircraft-derived metrics NIC, NAC, SIL, and BAQ 350. ADS-B signals 110 and all other transponder signals are also received at all ground stations 200, 210, time-stamped, and sent 250 to multilateration processor 310. Multilateration processor 310 may then generate SIC, SAC, SIL, and pass on BAQ information 360.

Therefore two streams of information are passed onto ATC system processor 400 containing the ADS-B aircraft-derived metrics NIC, NAC, SIL, and BAQ 350 and the multilateration-derived metrics SIC, SAC, SIL, and BAQ 360.

ATC system processor 400 may then be configured to pass along both sets of messages 410 to the ATC system, or to select a combination or fusion of the best metrics and tracking information for aircraft 110.

The performance of ADS-B as discussed above is determined by the performance of the navigation system (e.g., GNSS, GPS) and other on board aircraft sensors, whereas the performance of the surveillance system is dependent upon the ground-based infrastructure, such as SSR, Radar or multilateration. Thus, performance of the surveillance system is not dependent upon aircraft mounted hardware, which is not within the control of the airport operator or other user. As the two systems rely upon different hardware, one makes a good back-up for the other. However, since the technologies used are different in nature, comparing the metrics (performance parameters, accuracy, and the like) can be difficult. The present invention solves this problem by providing comparable metrics for both systems. Thus, an ATC system can evaluate the metrics of both systems and determine which is the more accurate of the two, or detect errors in a particular system. The alternate surveillance data metrics also allow determination of appropriate aircraft separation criteria to be applied.

Radar Performance accuracy specified for the FAA's newest Radar system the Air Traffic Control Beacon Interrogator model six (ATCBI-6), contained in FAA *ACTBI-6 Specification*, FAA-E-2923, Sep. 10, 1997, incorporated herein by reference, is as follows. Range Accuracy is defined as a Range Bias of +30 ft, and a Range Jitter Standard Deviation (SD) of 25 ft. Azimuth Accuracy is defined as a Bias of +0.033 degrees, and a Jitter SD of 0.066 degrees. The requirements are summarized in Table 9, along with the linear values based on distance. Terminal area accuracy is based on 60 NM, and en route accuracy is based on 250 NM. The RMS values are determined based on summing the bias and jitter as follows:

$$RMS = Bias + 2 \times SD \quad (1)$$

The azimuth RMS accuracy is 0.165 deg, the same as specified for the *Airport Surveillance Radar, Model* 9 (ASR-9), and close to the *Air Route Surveillance Radar, Model* 3 and *Model* 4 (ARSR-3 and ARSR-4) requirements as contained in *National Airspace System Specification—NAS-SS*-1000, FAA, May 1993, all of which are incorporated herein by reference. The azimuth accuracy, converted to a linear value may be used as the minimum requirement to be applied to Wide Area Multilateration (WAMLAT). Based on this, the accuracy requirements for a back-up surveillance system may be +320 nm for terminal area and +1333 m for en route surveillance.

The minimum update rates are 4.8 seconds for terminal area and 12 seconds for en route. The update requirements also include a minimum probability of detection. For the ATCBI-6 this is specified to be 98%. The ACTBI-6 specification specifies the rate of false target detection to be less than 1 in 400. The ADS-B standards are defined such that the probability of an undetected error in a single report is less than 10-6 per message, as specified in DO-242A, *Minimum Aviation System Performance Standards for ADS-B*, RTCA, Jun. 25, 2002, incorporated herein by reference. Since multilateration is considered to be a backup to ADS-B the latter should be a goal as the integrity requirement.

Availability requirements are specified by the FAA for individual surveillance systems, and are also defined in the overall NAS specification. For terminal area surveillance the most relevant requirements are for the ATCBI-6 and the Mode-S, both of which are specified to be 0.99995. For en route surveillance the most relevant requirements are for the ARSR-3 and ARSR-4, both of which are specified to be 0.9997.

Multilateration performance also needs to be quantified to compare the accuracy with Prior Art surveillance systems. By way of an example, an assessment is made of the potential coverage and accuracy available from multilateration systems implemented by Rannoch Corporation, assignee of the present application. Rannoch has many systems deployed world-wide for a variety of applications including military, commercial, and air traffic control, and in certain areas in the United States there are multiple systems that may be considered as part of a regional network.

The example shown in FIG. 3 is from the Ohio Valley, where there are four systems implemented at Louisville International Airport, Ohio State University, Cincinnati Lunken Municipal Airport, and Indianapolis International Airport. Each system is made up of five sensors, where one is on-airfield and four are off-airfield. When combined together, a wide area regional network of 20 sensors can be considered from this particular example.

It should be noted that the four systems are sited to provide terminal area coverage, and are not optimized for en route surveillance over longer distances. Nevertheless this analysis will show the possible performance for en route surveillance, even when ground system sites are not necessarily at optimum locations for en route coverage.

Coverage is met when the required accuracy is sufficient. FIG. 3 indicates jet routes above 18,000 feet, and the en route coverage area is approximately 125,000 square miles. With the geometry from the existing sensor layout, the predicted accuracy at 18,000 feet altitude is shown in FIG. 4. This performance is calculated with one sensor failed in each airport system, or a total of 4 failed sensors. This is one assumption used in the availability assessment. FIG. 5 shows predicted accuracy at a 4,000 ft altitude for terminal operations, showing a 60 mile radius required coverage in each of the four airport terminal areas. Again, the multilateration network is estimated to meet or exceed required surveillance accuracy throughout these areas.

System update rate is a function of the number of sensors in a coverage zone and probability of reception for each multilateration receiver. An update typically requires that three sensors receive and successfully decode the aircraft transponder transmissions. For Mode S transponders a conservative analysis would assume that only squitters, nominally transmitted once per second, are available for multilateration. A performance assessment was made of the Ohio Valley multilateration configuration. The results are shown in Table 10.

The results in Table 10 show that the multilateration system easily meets the required update rates for both terminal and en route coverage. The reason for the significant margin is that multilateration typically achieves good update performance within one second, while the terminal and en route requirements are 4.8 seconds and 12 seconds, respectively. Both regions were evaluated with a five second update. It was also assumed that one sensor in each airport system could be failed while still meeting the update requirements.

As previously indicated, the goal for multilateration should be the ADS-B message integrity, which is a probability of an undetected error less than 10-6 per message. This is allocated to two different requirements related to multilateration—false target detection and false identification. Both are integrity related parameters. Achieving a low probability of false target detection is a function of proper sensor location and processing techniques to detect erroneous measurements. These ensure that the probability of false target detection is less than 10-6 per update. The likelihood of false identification is minimized in a similar manner. A primary element here is the use of 24-bit parity for Mode S transmissions, which ensures that the probability of an undetected error is less than 10-7 per message.

Multilateration availability is a function of the reliability and level of redundancy, both in the central processing equipment and the sensors. For this assessment it was assumed that the central processing equipment has dual redundancy. The sensor configuration is such that a minimum of one sensor can fail in each airport system, without affecting performance. Another key assumption in assessing availability is the repair time following a failure. Typically this is assumed to be 0.5 hours for operational NAS systems. For this analysis it was assumed to be 8 hours, taking into account the system is a back-up and therefore should not require immediate repair. The results in Table 11 indicate that multilateration easily meets the requirements for both terminal and en route surveillance. As indicated in the discussion of the availability requirement, it is possible that a back-up system could have reduced availability. If that were the case the tradeoff could be made between the repair time following failures and overall availability, which would minimize the maintenance costs of the back-up system.

As previously noted, RTCA standards define the Figures of Merit or quality indicators for the system. When DO 260 was revised as 260A, NUC was specified in terms of NIC, NAC and SIL. Navigation Accuracy Category (NAC) is reported so that the surveillance application may determine whether the reported position has an acceptable level of accuracy for the intended application. In other words, the accuracy is based on the quality of the navigation information available to the aircraft, whether it is based on ground-based navigational aids or satellite systems.

For a ground-based equivalent, the following example of a wide area multilateration system is provided, using a distributed site across the Taiwan Strait from Kinmen Island to Peng Hu Island. If this ground-based infrastructure were to be used as an alternative or supplement to the aircraft's reported navigation position, the determining factor for accuracy (surveillance or navigation) is Dilution of Precision (or DOP as it is commonly called in satellite navigation). For the example here, a number of sensors were installed on the two islands across the Taiwan Strait. Six sensors were located at Kinmen Island (with two ATC centers) in the North East and two sensors were located on Peng Hu Island in the South West, connected via leased digital lines to Kinmen Island.

FIGS. 7 and 8 illustrate the calculated DOP calculations for the geometry of the solution at 20,000 feet and 10,000 feet, respectively, showing the accuracy of the surveillance solution is shown as <25 meters, 25-100 meters, 100-320 meters, and so on. This is an example of the use of surveillance from a ground-based infrastructure that may be used in lieu of an aircraft's reported navigation quality. As illustrated in FIGS. 7 and 8, the accuracy in the primary area of interest (between the two islands, where flight and approach paths are most common) is within 25 meters at both altitude levels. Accuracy outside of these areas drops off, however since these areas are not within the primary approach paths, increased accuracy may not be required. Increased accuracy could be easily obtained by adding additional sensors at other islands or even on floating buoys.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for measuring and monitoring performance metrics of a non-ADS-B tracking system and generating performance metrics for the non-ADS-B tracking system in terms of ADS-B equivalent performance metrics, the system comprising:

a plurality of ground station receivers for receiving from a vehicle, signals including ADS-B signals, the plurality of ground station receivers comprising at ADS-B stations, and alternate tracking system stations;

an ADS-B processor, coupled to at least a portion of the plurality of ground stations, for deriving aircraft-derived ADS-B metrics from the ADS-B signals;

an alternate tracking system processor, coupled to at least a portion of the plurality of ground stations for receiving tracking data from the alternate tracking system stations, determining vehicle position from the tracking data to generate an alternate tracking system vehicle position, and generating metrics from the alternate tracking system vehicle position in equivalent ADS-B metrics formats; and a system processor for receiving ADS-B metrics from the ADS-B processor and alternate tracking system metrics from the alternate tracking system processor, the system processor performing at least one of selecting and fusing tracking data based upon the ADS-B and alternate tracking system metrics.

2. The system of claim 1, wherein the alternate tracking system stations comprise combined ADS-B and alternate tracking system stations.

3. The system of claim 2, wherein the system processor is an Air Traffic Control (ATC) system processor.

4. The system of claim 3, wherein the ATC system processor evaluates metrics of both ADS-B and the alternate tracking systems and determines which is the more accurate of the two, and detects errors in one of the ADS-B and alternate tracking systems.

5. The system of claim 4, wherein the ATC system applies alternate surveillance data metrics to determine appropriate aircraft separation criteria.

6. The system of claim 3, wherein the ADS-B signals contain at least one or more of performance metrics, Navigation Accuracy Category (NAC), Navigation Integrity Category (NIC), Surveillance Integrity Level (SIL) and Barometric Altitude Quality (BAQ), which is passed on from the ADS-B stations to an ADS-B processor.

7. The system of claim 6, wherein the ADS-B processor outputs at least one or more of aircraft-derived metrics NIC, NAC, SIL, and BAQ to the ATC processor.

8. The system of claim 7, wherein the alternate tracking system processor generates at least one or more of Surveillance Integrity Category (SIC), Surveillance Integrity Level (SIL) and Barometric Altitude Quality (BAQ), metrics information.

9. The system of claim 8, wherein the alternate tracking system processor outputs at least one or more of surveillance-derived metrics SIC, SIL, and BAQ to the ATC processor.

10. The system of claim 1, wherein the alternate tracking system includes one or more of multilateration, primary radar, secondary Surveillance Radar (SSR), Passive SSR, Passive primary radar, ADS-B angle of arrival from phase measurements.

11. A method for measuring and monitoring performance metrics of a non-ADS-B tracking system and generating performance metrics for the non-ADS-B tracking system in terms of ADS-B equivalent performance metrics, the method comprising the steps of:

receiving in a plurality of ground station receivers, signals from a vehicle including ADS-B signals, the plurality of ground station receivers comprising at ADS-B stations, and alternate tracking system stations;

deriving, in an ADS-B processor, coupled to at least a portion of the plurality of ground stations, aircraft-derived ADS-B metrics from the ADS-B signals;

receiving tracking data from the alternate tracking system stations and determining vehicle position from the tracking data in an alternate tracking system processor, coupled to at least a portion of the plurality of ground stations, generating an alternate tracking system vehicle position, and generating metrics from the alternate tracking system vehicle position in equivalent ADS-B metrics formats; and receiving, in a system processor, ADS-B metrics from the ADS-B processor and alternate tracking system metrics from the alternate tracking system processor, the system processor performing at least one of selecting and fusing tracking data based upon the ADS-B and alternate tracking system metrics.

12. The method of claim 11, wherein the alternate tracking system stations comprise combined ADS-B and alternate tracking system stations.

13. The method of claim 12, wherein the system processor is an Air Traffic Control (ATC) system processor.

14. The method of claim 13, wherein the ATC system processor evaluates metrics of both ADS-B and the alternate tracking systems and determines which is the more accurate of the two, and detects errors in one of the ADS-B and alternate tracking systems.

15. The method of claim 14, wherein the ATC system applies alternate surveillance data metrics to determine appropriate aircraft separation criteria.

16. The method of claim 13, wherein the ADS-B signals contain at least one or more of performance metrics, Navigation Accuracy Category (NAC), Navigation Integrity Category (NIC), Surveillance Integrity Level (SIL) and Barometric Altitude Quality (BAQ), which is passed on from the ADS-B stations to an ADS-B processor.

17. The method of claim 16, wherein the ADS-B processor outputs at least one or more of aircraft-derived metrics NIC, NAC, SIL, and BAQ to the ATC processor.

18. The method of claim 17, wherein the alternate tracking system processor generates at least one or more of Surveillance Integrity Category (SIC), Surveillance Integrity Level (SIL) and Barometric Altitude Quality (BAQ), metrics information.

19. The method of claim 18, wherein the alternate tracking system processor outputs at least one or more of surveillance-derived metrics SIC, SIL, and BAQ to the ATC processor.

20. The method of claim 11, wherein the alternate tracking system includes one or more of multilateration, primary radar, secondary Surveillance Radar (SSR), Passive SSR, Passive primary radar, ADS-B angle of arrival from phase measurements.

* * * * *